United States Patent
Nakibly et al.

(10) Patent No.: US 11,880,327 B1
(45) Date of Patent: Jan. 23, 2024

(54) NON-COHERENT AND COHERENT CONNECTIONS IN A MULTI-CHIP SYSTEM

(71) Applicant: Amazon Technologies, Inc., Seattle, WA (US)

(72) Inventors: Guy Nakibly, Kedumim (IL); Barak Wasserstrom, Mitzpe Aviv (IL); Yaniv Shapira, Beit Yitshak Sha'ar Hefer (IL); Erez Izenberg, Tel Aviv-Jaffa (IL); Adi Habusha, Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 107 days.

(21) Appl. No.: 17/643,132

(22) Filed: Dec. 7, 2021

(51) Int. Cl.
*G06F 13/40* (2006.01)

(52) U.S. Cl.
CPC .................. *G06F 13/4027* (2013.01)

(58) Field of Classification Search
CPC .................................. G06F 13/4027
See application file for complete search history.

(56) References Cited

U.S. PATENT DOCUMENTS

| | | | | |
|---|---|---|---|---|
| 7,047,372 | B2* | 5/2006 | Zeitler | G06F 12/0817 711/E12.027 |
| 9,842,075 | B1 | 12/2017 | Davis et al. | |
| 2010/0318741 | A1* | 12/2010 | Scott | G06F 12/0817 711/E12.001 |
| 2013/0080667 | A1* | 3/2013 | Saripalli | G06F 12/0806 710/105 |
| 2016/0048347 | A1* | 2/2016 | Rangarajan | G06F 11/2092 711/156 |
| 2019/0034363 | A1* | 1/2019 | Palermo | G06F 13/4022 |
| 2019/0356611 | A1 | 11/2019 | Das Sharma et al. | |
| 2020/0192859 | A1 | 6/2020 | Jones et al. | |
| 2020/0358637 | A1 | 11/2020 | Nakayama et al. | |
| 2022/0197685 | A1* | 6/2022 | Palermo | G06F 9/5077 |
| 2022/0206977 | A1 | 6/2022 | Hu et al. | |
| 2022/0318163 | A1 | 10/2022 | Brewer | |
| 2023/0041617 | A1 | 2/2023 | Israel Vijayponraj et al. | |

OTHER PUBLICATIONS

U.S. Appl. No. 17/455,138, filed Nov. 16, 2021, Nakibly et al.
U.S. Non-Final Office Action dated Mar. 31, 2023 in U.S. Appl. No. 17/455,138.
U.S. Notice of Allowance dated Jul. 25, 2023 in U.S. Appl. No. 17/455,138.

* cited by examiner

*Primary Examiner* — Nimesh G Patel
(74) *Attorney, Agent, or Firm* — Weaver Austin Villeneuve & Sampson LLP (57) ABSTRACT

A coherent connection and a non-coherent connection are provided between system-on-chips (SoCs). The coherent connection can be coupled to coherent interconnects on the SoCs, and the non-coherent connection can be coupled to non-coherent interconnects on the SoCs. An input/output (I/O) transaction from an I/O device on a first SoC that is targeted to a second SoC can be transmitted via the non-coherent connection, and a processor transaction from the first SoC that is targeted to the second SoC can be transmitted via the coherent connection.

18 Claims, 8 Drawing Sheets

NON-COHERENT AND COHERENT CONNECTIONS IN A MULTI-CHIP SYSTEM

BACKGROUND

A multi-chip system may include a plurality of integrated circuits such as system-on-chips (SoCs) to support functionalities that demand high performance and compute power such as cloud computing, databases, application hosting, machine learning, among others. Each SoC may include a CPU complex, system memory, and caches coupled to a coherent interconnect fabric, which may be configured to maintain coherency among the CPUs in the multi-chip system.

BRIEF DESCRIPTION OF THE DRAWINGS

Various embodiments in accordance with the present disclosure will be described with reference to the drawings, in which.

DETAILED DESCRIPTION

A multi-chip system may include a plurality of integrated circuits such as system-on-chips (SoCs). Each SoC may include a coherent interconnect fabric coupled to a CPU complex, a system memory (e.g., DRAM, SRAM, etc.), one or more levels of caches, and a non-coherent interconnect fabric. The non-coherent interconnect fabric (also called an input/output (I/O) fabric) may also be coupled to various I/O devices and/or coprocessors. The coherent interconnect fabric (or simply the coherent interconnect) may be configured to maintain coherency for the shared data between the CPUs. The non-coherent interconnect fabric (or simply the non-coherent interconnect) may be configured to communicate the transactions with the I/O devices. In some systems, the coherent interconnects on the SoCs may be connected to provide a coherent connection for the traffic between the SoCs. The traffic may include transactions initiated by different I/O devices, coprocessors, local CPUs, or the remote CPUs.

Generally, the coherent connection between the SoCs is used for all the CPU traffic as well the I/O traffic. However, the coherent connection can have a coherency overhead to maintain coherency between the CPUs. For example, the CPUs caches can hold data that may be shared among the CPUs, which may require coherency maintenance for CPU transactions. Thus, cache coherency can incur additional costs in terms of hardware resources and power consumption to perform snooping. In some cases, the I/O traffic can interfere with the CPU traffic on the shared coherent connection, which can further increase the latency and affect the CPU performance. For example, if the I/O traffic is halted for a reason (e.g., ordering dependencies not met, or an irresponsive I/O device), a deadlock scenario can occur for the CPU traffic, which can crash the system.

Additionally, in most systems, the coherent connection may only support a data transfer size of a cache line granularity (e.g., 32 bytes or 64 bytes); however, the data transfer size for the I/O traffic can be higher (e.g., 512 bytes, 1 kilobytes). Thus, an I/O transaction having a bigger data transfer size than supported by the coherent connection has to be split up into multiple transactions with the cache-line granularity for the data transfer to go through the coherent connection between the SoCs, which can further increase the overall latency.

Embodiments of the disclosed technologies can provide an additional connection between the integrated circuits (ICs) such as SoCs, which can be used to communicate the I/O traffic between the ICs via the non-coherent interconnects. The additional connection may include a non-coherent connection between the I/O fabrics on the ICs. For example, the non-coherent interconnect on an IC may be coupled to the non-coherent interconnect on the other IC via the non-coherent connection. In some embodiments, a non-coherent interconnect on a first IC can determine that an incoming I/O transaction is destined to a second IC, and send the I/O transaction to a non-coherent interconnect on the second IC via the non-coherent connection instead of using the coherent connection. The non-coherent interconnect on the second IC can direct the I/O transaction to the desired destination on the second IC (e.g., a local memory or another I/O device). Thus, the coherent connection between the ICs can be used mainly for the CPU traffic, and the I/O traffic going through the non-coherent connection does not have to incur the coherency overhead related to the CPU traffic.

In some embodiments, the non-coherent connection between the ICs can support the maximum transaction unit (MTU) of the system, which is generally bigger than the cache-line transfer size supported by the coherent connection between the ICs. Thus, the I/O transactions do not have to be split up when going through the non-coherent connection. Furthermore, the risk for deadlock scenarios (e.g., caused by violations of ordering dependencies on I/O transactions) can be lowered by separating the connections for the CPU traffic and the I/O traffic. For example, if the I/O traffic on the non-coherent connection is halted for some reason, the CPU traffic can continue to flow on the coherent connection.

In some embodiments, the software running on an IC can determine whether the coherent connection or the non-coherent connection can be used to communicate an I/O transaction between the ICs. In some embodiments, each I/O device can be mapped to both an I/O memory space and a CPU memory space, which can allow selection between using the coherent connection or the non-coherent connection to access the I/O device by using different addresses. Some applications may require ordering between accesses to the same I/O address by different CPUs. In such cases, the software can map the transaction to use the coherent connection between the ICs, which can be configured to maintain the ordering between the accesses. If no ordering is needed, the software can map the transaction to use the non-coherent connection between the ICs, which can offload the I/O traffic from the coherent connection, and improve the system timing.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
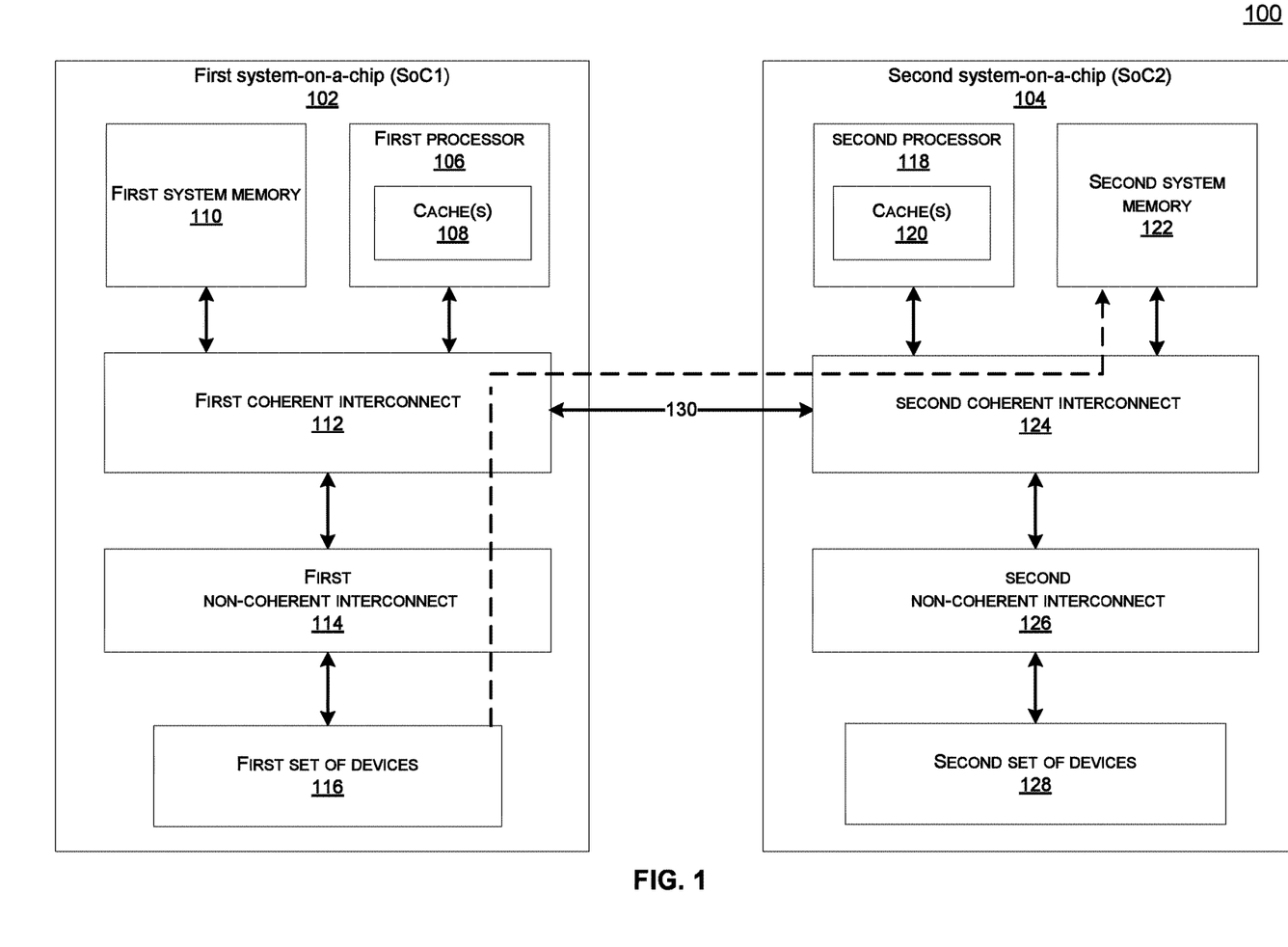
FIG. 1 illustrates an example multi-chip system comprising a plurality of SoCs coupled with each other via a coherent connection.

FIG. 1 illustrates an example multi-chip system 100 comprising a plurality of SoCs or other types of ICs coupled with each other via a coherent connection. In some examples, the multi-chip system 100 may include functionalities to support complex applications such as artificial intelligence, high power computing, gaming, machine learning, cloud computing, application hosting, etc.

Each SoC in the plurality of SoCs may include an integrated circuit (IC) device comprising a processor complex, a cache hierarchy, a system memory, I/O devices, and coprocessors, among other components. In most cases, the data to be operated on by the processors may reside in various caches or the system memory. Generally, cache coherency is implemented to ensure that each processor operates on consistent data irrespective of where the data resides. In some systems, the processors, caches, and the system memory for each SoC may be connected via an on-chip coherent interconnect, which may be configured to maintain data coherency between the caches and the system memory. In some implementations, maintaining the data coherency may also include maintaining an order between accesses to a shared memory by different processors.

As shown in FIG. 1, the multi-chip system 100 may include a first system-on-a-chip (SoC1) 102 coupled to a second system-on-a-chip (SoC2) 104 via a coherent connection 130. The SoC1 102 may include a first processor 106, a first system memory 110, a first coherent interconnect 112, a first non-coherent interconnect 114, and a first set of devices 116. The first processor 106 may include one or more on-chip caches 108. The SoC2 104 may include a second processor 118, a second system memory 122, a second coherent interconnect 124, a second non-coherent interconnect 126, and a second set of devices 128. The second processor 118 may include one or more on-chip caches 120. Each of the first processor 106 and the second processor 118 may include a plurality of processor cores, or a processor complex. Each of the first system memory 110 and the second system memory 110 may include DRAM, SRAM, register files, or other suitable memory. Note that each of the SoC1 102 and the SoC2 104 may include additional or different components such as memory controllers, I/O controllers, memory management units (MMUs), I/O MMUs, or DMA controllers, based on the functionality supported by the multi-chip system 100, and are not shown here for the ease of discussion.

Each of the first coherent interconnect 112 and the second coherent interconnect 124 may be configured to maintain memory coherency between the first processor 106 and the second processor 118 via the coherent connection 130. The coherent connection 130 may be based on Peripheral Component Interconnect (PCIe), QuickPath Interconnect (QPI), Ultra Path Interconnect (UPI), or a proprietary interface. Note that the coherent connection 130 is shown in FIG. 1 as a bidirectional connection; however, it should be noted that the coherent connection 130 can be implemented using a separate connection in each direction (e.g., transmit and receive). Other implementations are also possible without deviating from the scope of the disclosure.

In some implementations, the coherency can be maintained using a snoop-based coherency protocol. The first coherent interconnect 112 and the second coherent interconnect 124 may be implemented using meshes, crossbars, buses, matrices, bridges, hubs, ports, nodes, buffers, or other suitable components based on the system architecture. In some implementations, each of the first coherent interconnect 112 and the second coherent interconnect 124 may include higher level caches, address decoders, snoop filters, arbiters, and any other suitable components to maintain the memory coherency between the first processor 106 and the second processor 118 via the coherent connection 130. In some implementations, the first coherent interconnect 112 and the second coherent interconnect 124 may be based on Coherent Hub Interface (CHI) protocol, Advanced eXtensible Interface (AXI) Coherency Extension (ACE) protocol, Compute Express link (CXL), or another suitable protocol.

The first non-coherent interconnect 114 may represent an I/O fabric on the SoC1 102 for the first set of device 116, and the second non-coherent interconnect 126 may represent an I/O fabric on the SoC2 104 for the second set of device 128. Each of the first set of devices 116 and the second set of devices 128 may include I/O devices (e.g., PCIe devices, network controllers, storage devices, UARTs, USARTs, SPI devices, USB devices, etc.), co-processors (e.g., accelerators, crypto engines, GPUs, DSPs, etc.), or other types of peripherals. In this specification, the I/O devices, co-processors, and any other peripherals may be grouped together as I/O devices for ease of discussion. The first non-coherent interconnect 114 and the second non-coherent interconnect 126 generally do not support cache coherency, and therefore, do not incur the coherency overhead described with reference to the first coherent interconnect 112 and the second coherent interconnect 124. In some implementations, the first non-coherent interconnect 114 and the second non-coherent interconnect 126 may be based on Advanced eXtensible Interface (AXI) protocol, or another suitable protocol.

As an example, an I/O device in the first set of devices 116 may initiate a transaction to access the second system memory 122. The transaction may be received by the first non-coherent interconnect 114, which may direct the transaction to the first coherent interconnect 112 to be transmitted to the SoC2 104 via the coherent connection 130. The transaction may be received by the second coherent interconnect 124, which may perform certain tasks to maintain coherency for any shared data associated with the transaction, and then direct the transaction to the second system memory 122.

In the multi-chip system 100, the coherent connection 130 may be the only connection available between the SoC1 102 and the SoC 104 to communicate all the transactions between the SoCs. For example, the coherent connection 130 may also be used by the first processor 106 to access the second system memory 122 or one of the devices in the second set of devices 128, or by the second processor 118 to access the first system memory 110 or one of the devices in the first set of devices 116. Thus, sharing the coherent connection 130 by the I/O devices can interfere with the CPU transactions, which can affect the system timing. Additionally, the coherent connection 130 can have an overhead of coherency management for the processor transactions, which can further worsen the overall latency. Furthermore, the coherent connection 130 may only support cache-line size data transfers (e.g., 32 bytes or 64 bytes) for the transactions. However, the I/O transactions can have a higher data transfer size (e.g., 1024 bytes or more), thus, the I/O transactions may need to be split up into multiple smaller transactions to be communicated over the coherent connection 130, which can also degrade the system performance.

In some embodiments, a second connection can be provided between the SoC1 102 and the SoC2 104, which can be used for I/O transactions for non-coherent memory accesses, so that the coherent connection 130 can be used mainly for the coherent memory accesses for the processor transactions. This is further explained with reference to FIG. 2.

Figure 2:
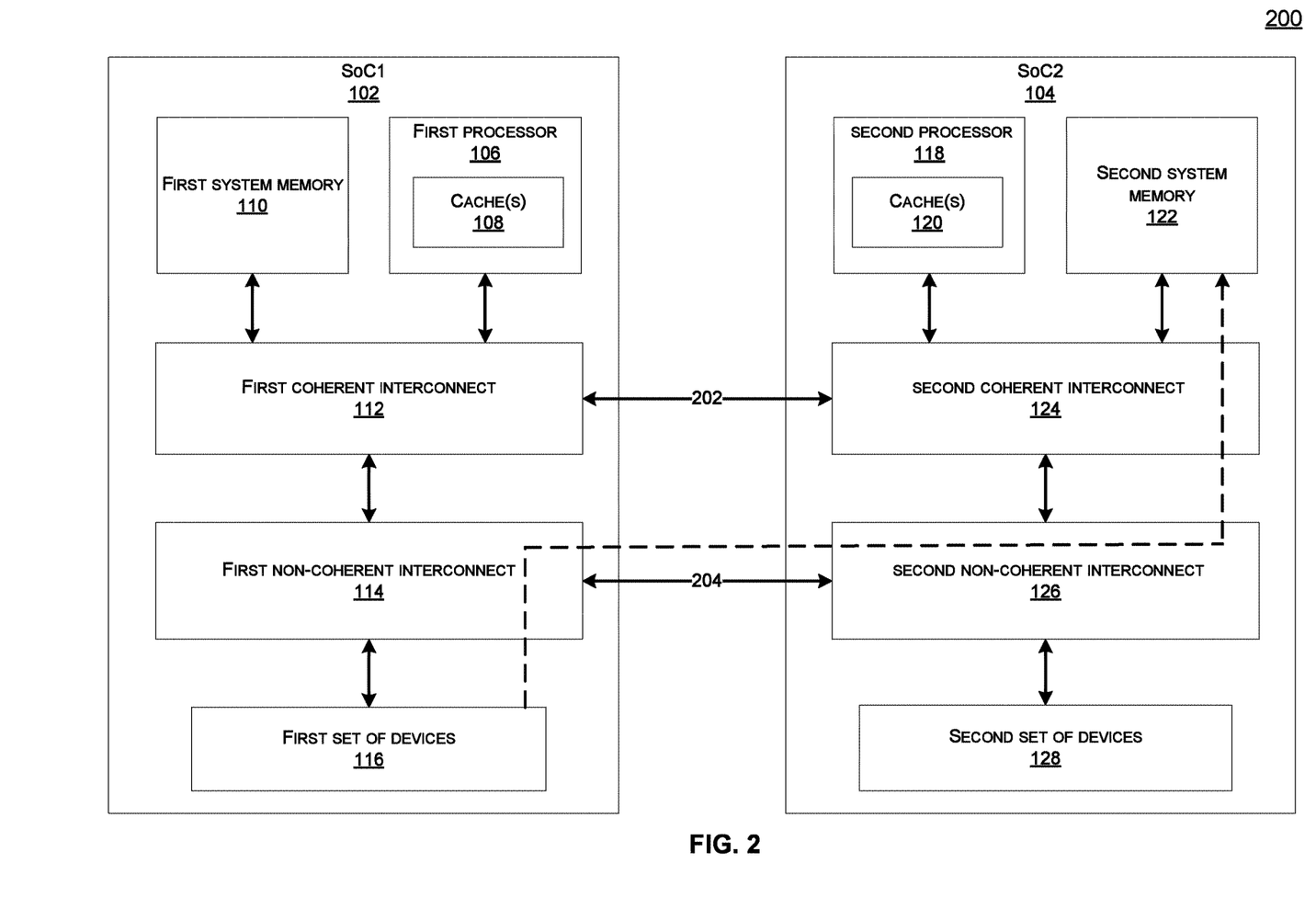
FIG. 2 illustrates an example multi-chip system comprising a plurality of SoCs coupled with each other via a coherent connection and a non-coherent connection, according to some embodiments.

FIG. 2 illustrates an example multi-chip system 200 comprising a plurality of integrated circuit devices such as SoCs that are operable to communicate with each other via a coherent connection and a non-coherent connection, according to some embodiments. Each of the IC devices may include a coherent interconnect that is operable to provide a coherent connection to communicate with other devices, as well as a non-coherent interconnect that is operable to provide a non-coherent connection to communicate with other devices.

Some embodiments can provide two separate connections between the SoC1 102 and the SoC2 104, which can allow separation of the I/O traffic from the CPU traffic, and improve system timing. As shown in FIG. 2, the SoC1 102 and the SoC2 104 can be communicatively coupled via a coherent connection 202 and a non-coherent connection 204. The coherent connection 202 can be similar to the coherent connection 130, as discussed with reference to FIG. 2. The non-coherent connection 204 may be coupled to the first non-coherent interconnect 114 and the second non-coherent interconnect 126.

The first non-coherent interconnect 114 may be configured to receive a transaction initiated by an I/O device in the first set of devices 116, and determine whether the transaction is addressed to the SoC1 102 or the SoC2 104. If the transaction is addressed to the SoC2 104, the first non-coherent interconnect 114 may transmit the transaction to the SoC2 104 via the non-coherent connection 204. The transaction may be received by the second non-coherent interconnect 126 via the non-coherent connection 204. The second non-coherent interconnect 126 may be configured to determine whether the transaction is addressed to the second system memory 122 or to one of the devices in the second set of devices 128. If the transaction is addressed to a device in the second set of devices 128, the second non-coherent interconnect 126 may direct the transaction to that device. For example, the device can be a PCIe device or an accelerator engine.

If the transaction is addressed to the second system memory 122, the second non-coherent interconnect 126 may direct the transaction to the second coherent interconnect 124, which may direct the transaction to the second system memory 122. The second coherent interconnect 124 may also perform suitable tasks to maintain coherency for any shared data associated with the transaction. For example, a snoop filter in the second coherent interconnect 124 may communicate with the first coherent interconnect 112 to determine if the data at a destination address of the transaction is shared between the first processor 106 and the second processor 118, and make the corresponding caches coherent, as needed, using any suitable mechanism.

Thus, directing the I/O transactions, which do not require coherency maintenance, to the SoC2 104 via the non-coherent connection 204 instead of the coherent connection 202, can allow the coherent connection 202 to be used mainly for the processor traffic, which can improve the system timing dramatically, and reduce the risk for deadlock scenarios and ordering dependencies. Additionally, the non-coherent connection 204 can allow communicating the I/O transactions with a maximum transaction unit (e.g., 1000 bytes or more) supported by the multi-chip system 200, which can eliminate the need to split the I/O transactions into cache-line size transactions for communicating over the coherent connection 202.

In some embodiments, the software for an application executing on an SoC can determine whether the coherent connection or the non-coherent connection can be used for communicating an I/O transaction between the SoCs. In some embodiments, each I/O device in the system can be mapped to a CPU memory space as well as an I/O memory space, which can allow the software to direct which connection is used for the I/O transactions. Each I/O device can be mapped twice, in the CPU memory space via the coherent connection, and in the I/O memory space via the non-coherent connection, which can enable the software to route a transaction. For example, a transaction which does not require coherency between the processors can be routed to the non-coherent connection by using the address mapped in the I/O memory space to reduce the load from the coherent connection. This is further explained with reference to FIG. 3.

Figure 3:
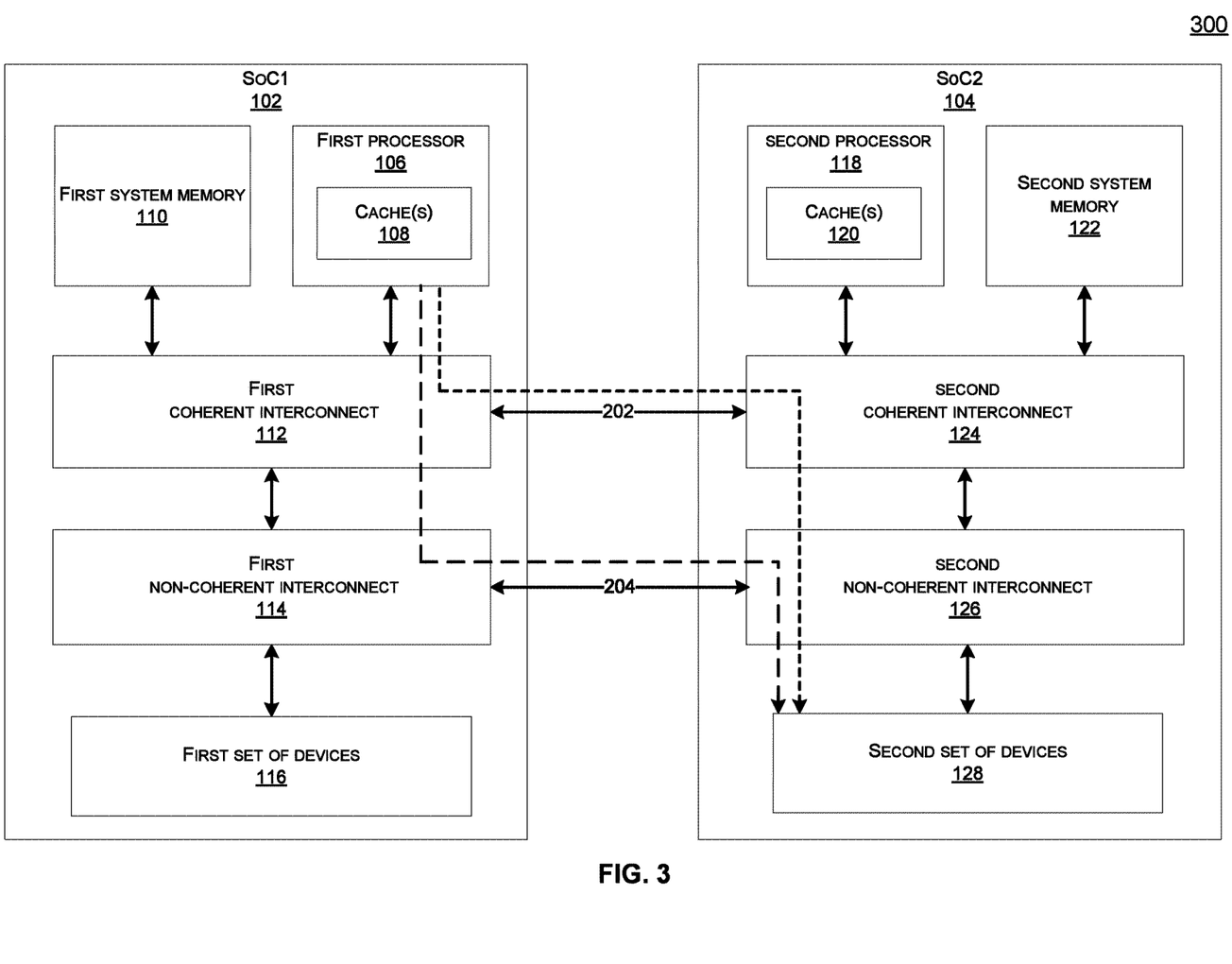
FIG. 3 illustrates an example mapping of a transaction via a coherent connection or a non-coherent connection in a multi-chip system, according to some embodiments.

FIG. 3 illustrates an example mapping of a transaction via a coherent connection or a non-coherent connection in a multi-chip system 300, according to some embodiments.

In some embodiments, each I/O device in the first set of devices 116 and in the second set of devices 128 can be mapped to a first address range corresponding to the non-coherent connection 204, and to a second address range corresponding to the coherent connection 202, which can allow the software running on the first processor 106, or the second processor 118 to direct a transaction to one of those I/O devices via the coherent connection 202 or via the non-coherent connection 204. This is further explained with reference to FIG. 4.

Figure 4:
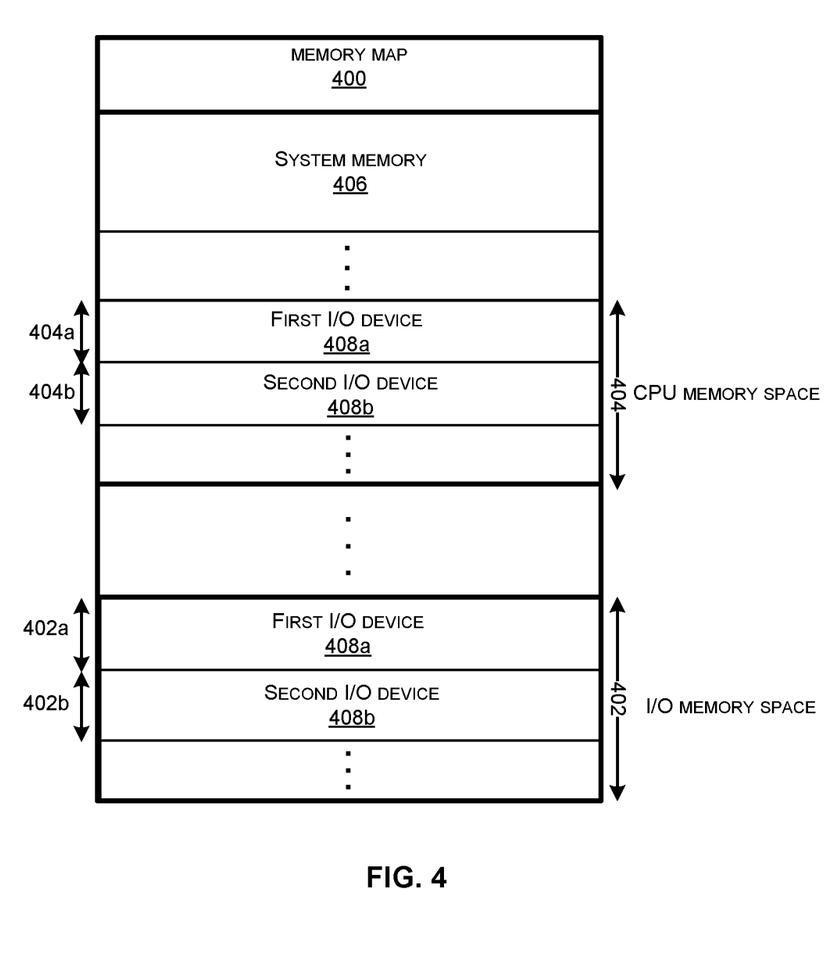
FIG. 4 illustrates an example memory map for an SoC comprising two memory mapped regions for each I/O device, according to some embodiments.

FIG. 4 illustrates an example memory map 400 for an SoC comprising two memory mapped regions for each I/O device, according to some embodiments. For example, the memory map 400 may correspond to the SoC1 102 or the SoC2 104. Note that the memory map 400 may include the mapping for all the SoCs in the multi-chip system 300; however, for ease of discussion, FIG. 3 only shows the mapping for a single SoC.

In some embodiments, each I/O device can be mapped to two different memory regions in the memory map 400. As shown in FIG. 4, each I/O device in the SoC1 102 can be mapped to a respective first memory region in an I/O memory space 402, and to a respective second memory region in a CPU memory space 404. The memory map 400 may also include a memory region corresponding to a system memory 406. For example, the system memory 406 can be the first system memory 110, and a first I/O device 408a and a second I/O device 408b can be part of the first set of devices 116 in the SoC1 102.

In some embodiments, the first I/O device 408a may be mapped to a first memory region 402a in the I/O memory space 402 corresponding to a first address range in an address space of the first processor 106, and to a second memory region 404a in the CPU memory space 404 corresponding to a second address range in the address space of the SoC1 102. Similarly, the second I/O device 408b may be mapped to a first memory region 402b in the I/O memory space 402 corresponding to a third address range in the address space of the first SoC1 102, and to a second memory region 404b in the CPU memory space 404 corresponding to a fourth address range in the address space of the SoC1 102. In some embodiments, the first address range and the third address range may correspond to the non-coherent connection 204, and the second address range and the fourth address range may correspond to the coherent connection 202.

Similarly, for the SoC2 104, each I/O device in the SoC2 104 can be mapped to a respective first memory region in the I/O memory space 402 corresponding to a respective first address range in an address space of the second SoC2 104, and to a respective second memory region in the CPU memory space 404 corresponding to a respective second address range in the address space of the second SoC2 104. For example, the system memory 406 can be the second system memory 122, and the first I/O device 408a and the second I/O device 408b can be part of the second set of devices 128.

Referring back to FIG. 3, the software for a first application executing on the SoC1 102 may map a transaction targeted to a first I/O device in the second set of devices 128, which is shared between the first processor 106 and the second processor 118, and may therefore require coherency between the first processor 106 and the second processor 118, e.g., to maintain ordering between accesses from the first processor 106 and the second processor 118. In such cases, the transaction may include a destination address that corresponds to the second address range. Thus, the transaction may be transmitted to the second coherent interconnect 124 via the coherent connection 202 corresponding to the second address range. The transaction can then be sent to the first I/O device in the second set of devices 128 internally in the SoC2 104 via the second non-coherent interconnect 126.

In some embodiments, the software for a second application executing on the SoC1 102 can map a transaction to a second I/O device in the second set of devices 128 that is not shared between the first processor 106 and the second processor 118, and therefore does not require any coherency between the first processor 106 and the second processor 118, e.g., maintaining an order of the accesses is not needed. In such cases, the transaction may include a destination address that corresponds to the first address range. Thus, the transaction may be transmitted to the second non-coherent interconnect 126 via the non-coherent connection 204 corresponding to the first address range, which may direct the transaction to the second I/O device. Thus, the load on the coherent connection 202 can be reduced by mapping the I/O transactions to the non-coherent connection 204, when there are no ordering dependencies. This can also help reduce the risk for deadlock scenarios, e.g., a halt in the I/O traffic on the non-coherent connection 204 may not interfere with the CPU traffic on the coherent connection 202.

Figure 5:
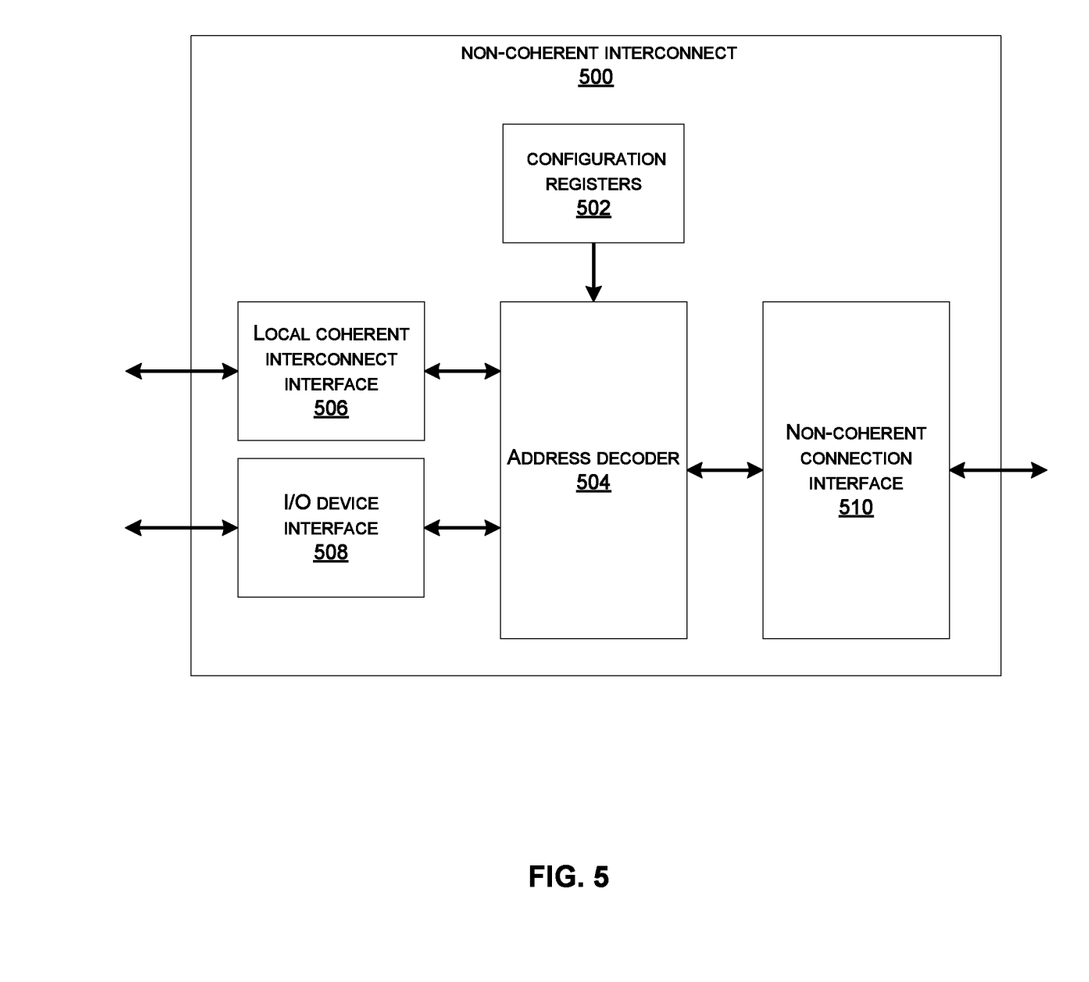
FIG. 5 illustrates an example block diagram for a non-coherent interconnect for an SoC, in some embodiments.

FIG. 5 includes an example block diagram for a non-coherent interconnect 500 for an SoC, in some embodiments. The non-coherent interconnect 500 can be an example of the first non-coherent interconnect 114 in the SoC1 102, or the second non-coherent interconnect 126 in the SoC2 104.

The non-coherent interconnect 500 may include configuration registers 502, an address decoder 504, a local coherent interconnect interface 506, one or more I/O device interfaces 508, and a non-coherent connection interface 510. Note that the non-coherent interconnect 500 may include different or additional components to support the interconnect functionality, which are not shown here for the ease of illustration. For example, the non-coherent interconnect 500 may also include meshes, rings, crossbars, nodes, switches, bridges, buffers, etc., based on the implementation.

The configuration registers 502 may include one or more configuration registers, which may be programmed with a first address range corresponding to a first memory region in the I/O memory space 402 and a second address range corresponding to a second memory region in the CPU memory space 404 allocated to each of the I/O devices.

The local coherent interconnect interface 506 may be coupled to the coherent interconnect in the local SoC. For example, the coherent interconnect interface 506 of the first non-coherent interconnect 114 in the SoC1 102 may be coupled to the first coherent interconnect 112, and the coherent interconnect interface 506 of the second non-coherent interconnect 126 in the SoC2 104 may be coupled to the second coherent interconnect 124. The I/O device interface 508 may be coupled to an I/O device on the SoC. For example, the I/O device interface 508 can be coupled to one or more I/O devices in the first set of devices 116 in the SoC1 102. In some implementations, multiple I/O device interfaces 508 can be used for a plurality of I/O devices. In some implementations, the I/O device interface 508 may be coupled to an I/O hub, which may be coupled to a plurality of I/O devices.

The non-coherent connection interface 510 may be coupled to the non-coherent connection to communicate with the other SoC. For example, the non-coherent connection interface 510 of the first non-coherent interconnect 114 in the SoC1 102, and the non-coherent connection interface 510 of the second non-coherent interconnect 126 in the SoC2 104 may be coupled to the non-coherent connection 204. The non-coherent connection interface 510 may include ports, pins, buffers, transmitters, receivers, or any suitable components to enable the communication with the other SoC via the non-coherent connection 204.

The address decoder 504 may be configured to compare a destination address of an incoming transaction with the first address range and with the second address range programmed in the configuration registers 502 to determine whether the transaction should be directed to the non-coherent connection 204 via the non-coherent connection interface 510, or to the local coherent interconnect via the coherent interconnect interface 506. The address decoder 504 may also be configured to compare the destination address of a transaction received by the non-coherent connection interface 510 via the non-coherent connection 204 from the other SoC to determine whether the transaction should be directed to the local coherent interconnect via the coherent interconnect interface 506, or to one of the I/O devices via the I/O device interface 508.

Figure 6:
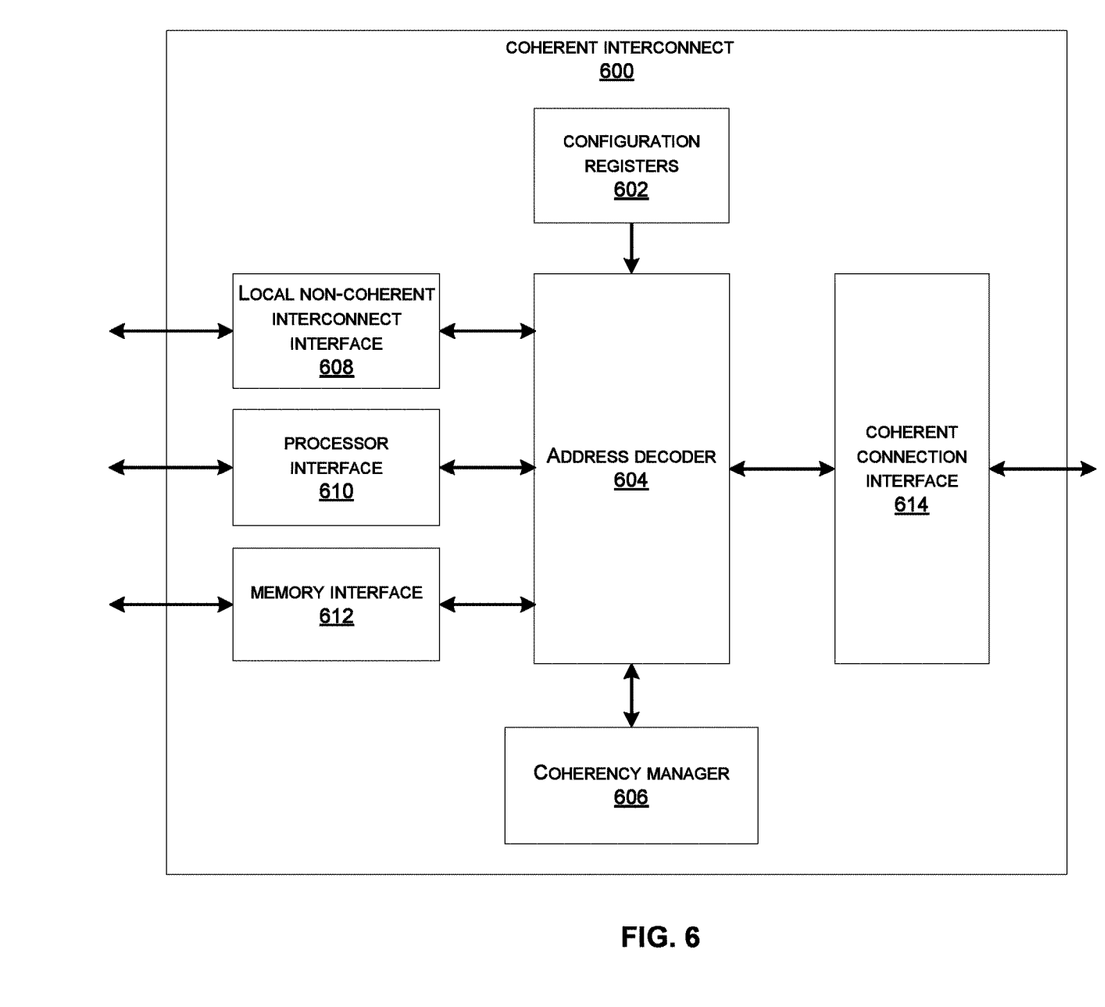
FIG. 6 illustrates an example block diagram for a coherent interconnect for an SoC, in some embodiments.

FIG. 6 includes an example block diagram for a coherent interconnect 600 for an SoC, in some embodiments. The coherent interconnect 600 can be an example of the first coherent interconnect 112 in the SoC1 102, or the second coherent interconnect 124 in the SoC2 104.

The coherent interconnect 600 may include configuration registers 602, a coherency manager 604 comprising an address decoder 606, a local non-coherent interconnect interface 608, one or more processor interfaces 610, one or more memory interfaces 612, and a coherent connection interface 614. Note that the coherent interconnect 600 may include different or additional components to support the interconnect functionality, which are not shown here for the ease of illustration. For example, the coherent interconnect

600 may also include meshes, rings, crossbars, nodes, switches, bridges, buffers, etc., based on the implementation.

The configuration registers 602 may include one or more configuration registers, which may be programmed with a first address range corresponding to a first memory region in the I/O memory space 402 and a second address range corresponding to a second memory region in the CPU memory space 404 allocated to each of the I/O devices.

The local non-coherent interconnect interface 608 may be coupled to the non-coherent interconnect in the local SoC. For example, the local non-coherent interconnect interface 608 of the first coherent interconnect 112 in the SoC1 102 may be coupled to the first non-coherent interconnect 114, and the local non-coherent interconnect interface 608 of the second coherent interconnect 124 in the SoC2 104 may be coupled to the second non-coherent interconnect 126. The processor interface 610 may be coupled to one or more processors on the SoC. For example, the processor interface 610 of the first coherent interconnect 112 can be coupled to the first processor 106, and the processor interface 610 of the second coherent interconnect 124 can be coupled to the second processor 118.

The memory interface 612 may be coupled to one or more memory devices on the SoC. For example, the memory interface 612 in the SoC1 102 may be coupled to the first system memory 110 and the one or more caches 108, and the memory interface 612 in the SoC2 104 may be coupled to the second system memory 122 and the one or more caches 120.

The coherent connection interface 614 may be coupled to the coherent connection with the other SoC. For example, the coherent connection interface 614 of the first coherent interconnect 112 in the SoC1 102, and the coherent connection interface 614 of the second coherent interconnect 124 in the SoC2 104 may be coupled to the coherent connection 202. The coherent connection interface 614 may include ports, pins, buffers, transmitters, receivers, or any suitable components to enable the communication with the other SoC.

The address decoder 604 may be configured to compare a destination address of an incoming transaction with the first address range and the second address range programmed in the configuration registers 602 to determine whether the transaction should be directed to the coherent connection 202 via the coherent connection interface 614, or to the local non-coherent interconnect via the local non-coherent interconnect interface 608. The address decoder 606 may also be configured to compare the destination address of a transaction received via the coherent connection interface 614 from the other SoC to determine whether the transaction should be directed to the local non-coherent interconnect via the local noncoherent interconnect interface 608, or to system memory via the memory interface 612.

The coherency manager 604 may be configured to maintain coherency between the processors for any shared data using any suitable coherency protocol. In some examples, the coherency manager 604 may perform coherency checks for every transaction received by the coherent interconnect 600 and perform any necessary tasks to maintain the coherency. In some embodiments, the coherency manager 604 may include a snoop filter to monitor and manage the coherency states of all the shared data between the processors. Note that any suitable mechanism to maintain the coherency can be used within the scope of the disclosure.

Figure 7:
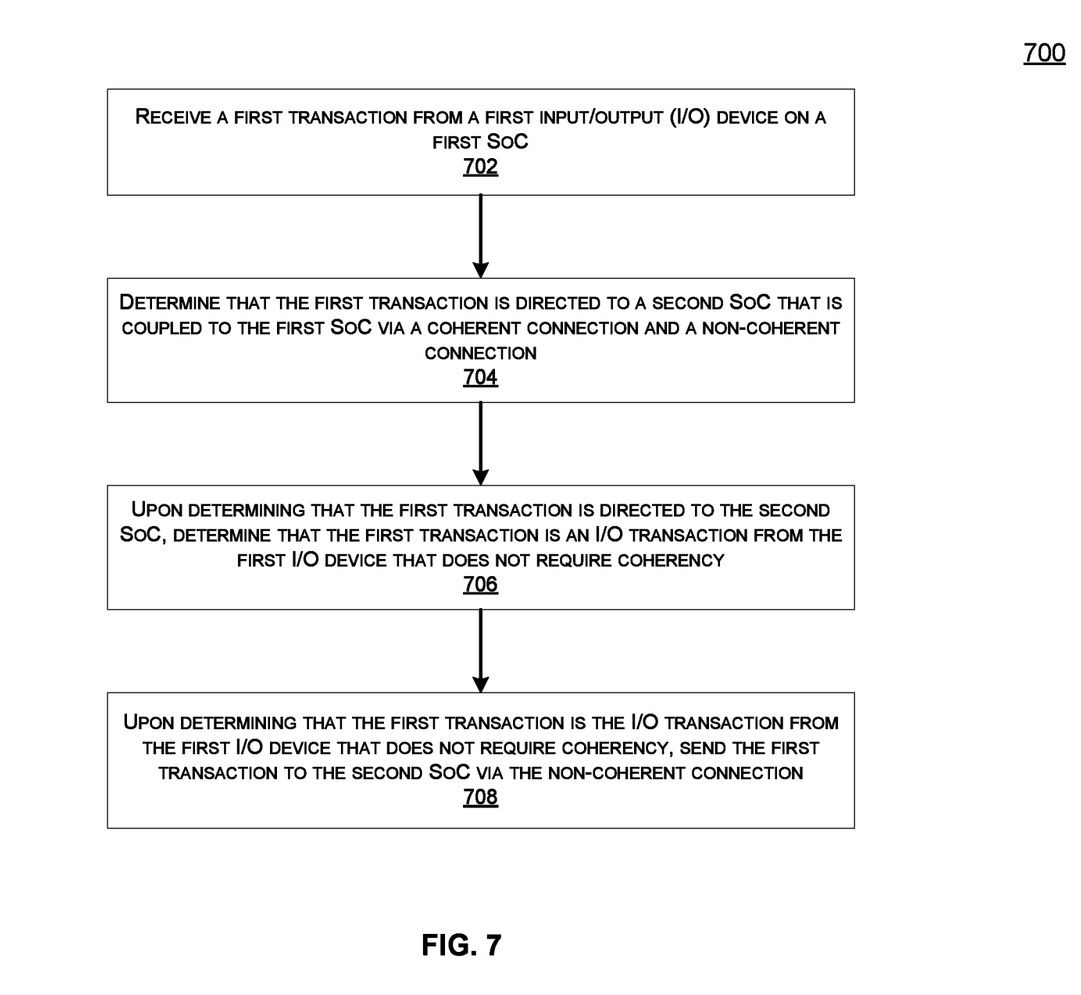
FIG. 7 illustrates a flow chart for a method performed by a first SoC in a multi-chip system, according to some embodiments.

FIG. 7 includes a flow chart for a method 700 performed by a first SoC in a multi-chip system, according to some embodiments. For example, the method may be performed by any of the SoCs in the multi-chip system 200, e.g., the SoC1 102.

In step 702, the method may include receiving a first transaction from a first I/O device on a first SoC. As an example, the SoC1 102 may receive a first transaction from an I/O device in the first set of devices 116. The I/O device can be the first I/O device 408*a* in FIG. 4, which may be mapped to the first memory region 402*a* corresponding to a first address range and to the second memory region 404*a* corresponding to a second address range in the address space of the first processor 106. For example, the first I/O device 408*a* can be a PCIe device. The first transaction may be received by the first non-coherent interconnect 114 via the I/O device interface 508.

In step 704, the method may include determining that the first transaction is directed to a second SoC that is coupled to the first SoC via a coherent connection and a non-coherent connection. The SoC1 102 may determine that the first transaction is directed to the SoC2 104, which is coupled to the SoC1 102 via the coherent connection 202 and the non-coherent connection 204. For example, the address decoder 504 in the first non-coherent interconnect 114 may determine that the first transaction is directed to the SoC2 104 based on a destination address of the first transaction.

In step 706, the method may include determining that the first transaction is an I/O transaction from the first I/O device that does not require coherency, upon determining that first transaction is directed to the second SoC. For example, the address decoder 504 in the first non-coherent interconnect 114 may determine that the first transaction does not require coherency between the first processor 106 and the second processor 118 based on the destination address of the first transaction and the first address range programmed in the configuration registers 502. For example, the application executing on the SoC1 102 may not require coherency for the first transaction and therefore map the first transaction to the first address range in the I/O memory space 402.

In step 708, the method may include sending the first transaction to the second SoC via the non-coherent connection, upon determining that the first transaction is the I/O transaction from the first I/O device that does not require coherency. For example, the first non-coherent interconnect 114 may transmit the first transaction via the non-coherent connection 204 to the SoC2 104 using the non-coherent connection interface 510. Thus, transmitting the first transaction from the I/O device on the SoC1 102 to the SoC2 104 via the non-coherent connection 204 can allow the processor transactions to continue on the coherent connection 202, in case the first transaction is halted on the non-coherent connection 204 due to some ordering dependencies or other reason. Furthermore, the first transaction can be performed on the non-coherent connection 204 without incurring any coherency overhead, which can be the case for the coherent connection 202.

The first transaction can be received by the non-coherent connection interface 510 of the second non-coherent interconnect 126 in the SoC2 104. In some examples, the first transaction may include a destination address corresponding to the second system memory 122. The address decoder 504 in the second non-coherent interconnect 126 may determine that the first transaction is directed to the second system memory 122 based on the destination address of the first transaction, and direct the first transaction to the second coherent interconnect 124 via the coherent interconnect interface 506. The non-coherent interconnect interface 608 in the second coherent interconnect 124 may receive the first transaction, which can be decoded by the address decoder 604. The coherency manager 606 may determine that there is no coherency required for the first transaction, and therefore the first transaction can be sent to the second system memory 122 via the memory interface 612.

In some examples, the first transaction may include a destination address corresponding to a second I/O device in the second set of devices 128. For example, the second I/O device can be a crypto engine. The address decoder 504 in the second non-coherent interconnect 126 may determine that the first transaction is directed to the second I/O device based on the destination address of the first transaction, and direct the first transaction to the second I/O device via the I/O device interface 508.

In some examples, the method may also include receiving a second transaction from the first processor 106, and determining that the second transaction is directed to the second system memory 122. The method may also include determining that the second transaction is a processor transaction from the first processor that maintains processor cache coherency, upon determining that the second transaction is directed to the system memory on the second SoC. The method may also include transmitting the second transaction to the second SoC via the coherent connection, upon determining that the second transaction is the processor transaction from the first processor that maintains processor cache coherency. For example, the second transaction may be received by the first coherent interconnect 112 using the processor interface 610. The address decoder 604 may determine that the second transaction is directed to the second system memory 122. The address decoder 604 may also determine that the second transaction is the processor transaction from the first processor 106 that maintains processor cache coherency based on the destination address of the second transaction. The coherency manager 606 may perform any coherency related tasks, as needed, for the second transaction, and the second transaction can be transmitted to the SoC2 104 via the coherent connection 202.

The second transaction may be received by the second coherent interconnect 124 using the coherent connection interface 614, and decoded by the address decoder 604. In some embodiments, the coherency manager 606 in both the first coherent interconnect 112 and the second coherent interconnect 124 may communicate with each other to perform any coherency maintenance related to the second transaction. The second transaction can be transmitted to the second system memory 122 via the memory interface 612.

In some examples, the method may also include receiving a second transaction from the first processor 106, and determining that the second transaction is directed to a second I/O device in the SoC2 104. For example, the second I/O device can be part of the second set of devices 128. The second I/O device can be the first I/O device 408a in FIG. 4, which may be mapped to the first memory region 402a corresponding to a first address range and to the second memory region 404a corresponding to a second address range in the address space of the second processor 118. The method may also include selecting between the coherent connection or the non-coherent connection to transmit the second transaction based on whether a destination address of the second transaction is in the first address range or in the second address range. The first coherent interconnect 112 may receive the second transaction using the processor interface 610, and the address decoder 604 may determine whether a destination address of the second transaction corresponds to the first address range or the second address range based on the configuration registers 602. The address decoder 604 may select the non-coherent connection 204 if the destination address corresponds to the first address range, or the coherent connection 202 if the destination address corresponds to the second address range.

In some examples, the SoC1 102 may receive a second transaction from the first I/O device, and determine that the second transaction is directed to the first system memory 110. The second transaction can be received by the first non-coherent interconnect 114 using the I/O device interface 508. In some examples, the second transaction may include a destination address corresponding to the first system memory 110. The address decoder 504 in the first non-coherent interconnect 114 may determine that the second transaction is directed to the first system memory 110 based on the destination address of the second transaction, and direct the second transaction to the first coherent interconnect 112 via the coherent interconnect interface 506. The non-coherent interconnect interface 608 in the first coherent interconnect 112 may receive the second transaction, which can be decoded by the address decoder 604, and transmitted to the first system memory 110 via the memory interface 612.

It should be noted that although certain aspects of the systems herein have been described as transmitting I/O transactions on the non-coherent connection between the two SoCs, an I/O transaction can also be transmitted on the coherent connection. This can be done, for example, if an I/O device of one SoC is writing a system memory location on the other SoC, and that memory location is cached by the processors of the two SoCs. Such an I/O transaction can be transmitted on the coherent connection, for example, by using an address that is mapped to the coherent connection as described above. In such scenarios, cache coherency can be maintained between the two SoCs.

In some scenarios, if an I/O transaction is transmitted on the non-coherent connection, but the transaction is writing to a system memory location that is cached by the processors, the coherency manager of either SoC can perform a snoop request over the coherent connection. The snoop transaction can be used, for example, to invalidate the cached locations if coherency with the memory location no longer needs to be maintained. The snoop request on the coherence connection can also be used to update the cached locations on the two processors with the newly written data if coherency is continued to be maintained despite the transaction having been transmitted on the non-coherent connection. This may occur, for example, if the software application issues the transaction using an address that is mapped to the non-coherent connection.

Figure 8:
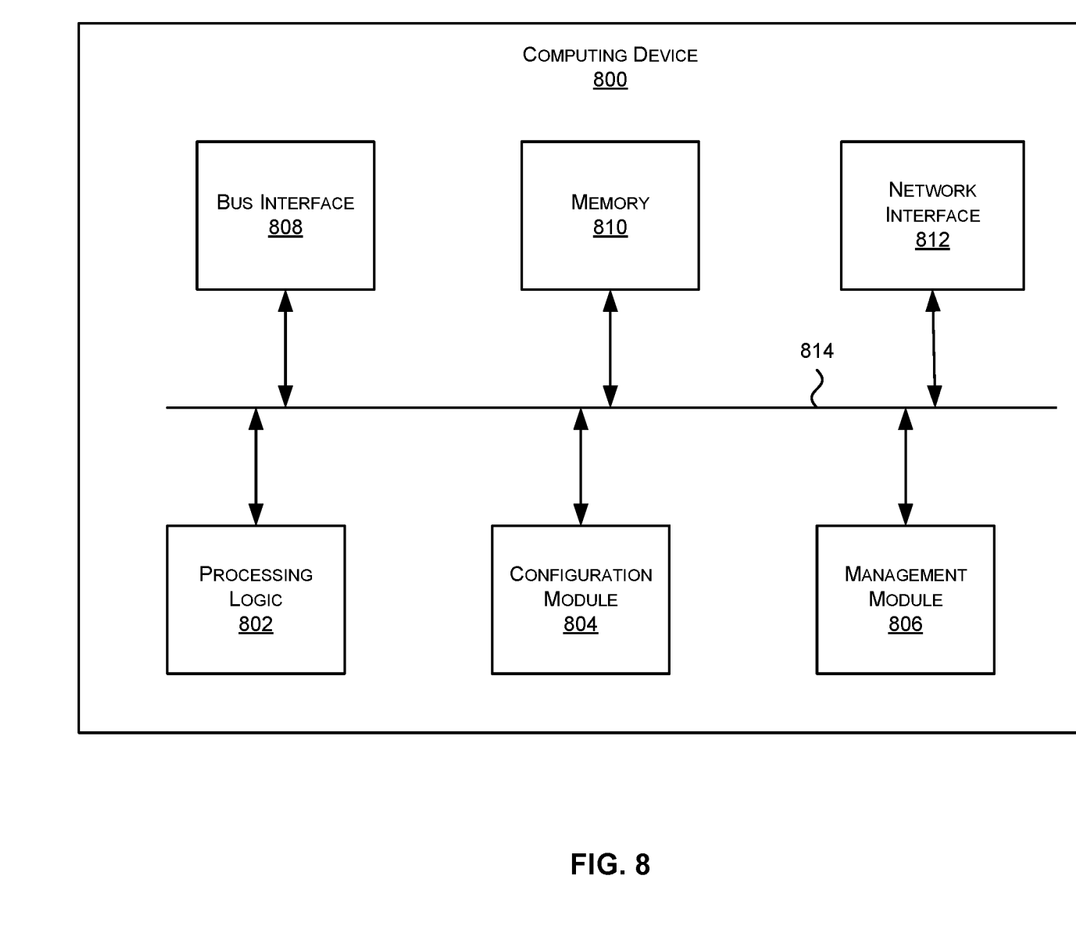
FIG. 8 illustrates an example of a computing device, according to certain aspects of the disclosure.

FIG. 8 illustrates an example of a computing device 800. Functionality and/or several components of the computing device 800 may be used without limitation with other embodiments disclosed elsewhere in this disclosure, without limitations. The computing device 800 may facilitate processing of packets and/or forwarding of packets from the computing device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 800 may be the recipient and/or generator of packets. In some implementations, the computing device 800 may modify the contents of the packet before forwarding the packet to another device. The computing device 800 may be a peripheral device coupled to another computer device, a switch, a router or any other suitable device enabled for receiving and forwarding packets.

In one example, the computing device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The computing device 800 may include additional modules, which are not illustrated here. In some implementations, the computing device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions, or any other circuitry configured to perform logical arithmetic and floating point operations. Examples of processors that may be included in the processing logic 802 may include processors developed by ARM©, MIPS©, AMD©, Intel©, Qualcomm©, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 800, while in other cases some or all of the memory may be external to the computing device 800. The memory 810 may store an operating system comprising executable instructions that, when executed by the processing logic 802, provides the execution environment for executing instructions providing networking functionality for the computing device 800. The memory may also store and maintain several data structures and routing tables for facilitating the functionality of the computing device 800.

In some implementations, the configuration module 804 may include one or more configuration registers. Configuration registers may control the operations of the computing device 800. In some implementations, one or more bits in the configuration register can represent certain capabilities of the computing device 800. Configuration registers may be programmed by instructions executing in the processing logic 802, and/or by an external entity, such as a host device, an operating system executing on a host device, and/or a remote device. The configuration module 804 may further include hardware and/or software that control the operations of the computing device 800.

In some implementations, the management module 806 may be configured to manage different components of the computing device 800. In some cases, the management module 806 may configure one or more bits in one or more configuration registers at power up, to enable or disable certain capabilities of the computing device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. $$$, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A multi-chip system comprising:
a first system-on-a-chip (SoC) comprising:
a first processor;
a first system memory;
a first coherent interconnect coupled to the first processor and to the first system memory;
a first non-coherent interconnect coupled to the first coherent interconnect; and
a first input/output (I/O) device coupled to the first non-coherent interconnect; and
a second SoC comprising:
a second processor;
a second system memory;
a second coherent interconnect coupled to the second processor and to the second system memory;
a second non-coherent interconnect coupled to the second coherent interconnect; and
a second input/output (I/O) device coupled to the second non-coherent interconnect,
wherein the first coherent interconnect is coupled to the second coherent interconnect via a coherent connection between the first SoC and the second SoC, wherein the coherent connection is configured to maintain coherency between the first processor and the second processor,
wherein the first non-coherent interconnect is coupled to the second non-coherent interconnect via a non-coherent connection between the first SoC and the second SoC,
wherein the non-coherent connection is used for I/O transactions between the first SoC and the second SoC that do not require coherency, and
wherein the coherent connection is used for processor transactions between the first SoC and the second SoC that maintain processor cache coherency.

2. The multi-chip system of claim 1, wherein a maximum allowable data size of a data transfer on the coherent connection is a size of a cache-line.

3. The multi-chip system of claim 2, wherein a maximum allowable data size of a data transfer on the non-coherent connection is greater than a size of the cache-line.

4. The multi-chip system of claim 1, wherein the second I/O device is memory mapped to a first address range corresponding to the non-coherent connection, and to a second address range corresponding to the coherent connection, and wherein the first SoC is further configured to select between the non-coherent connection or the coherent connection to transmit a transaction to the second I/O device based on a destination address of the transaction.

5. A first integrated circuit (IC) device comprising:
a first processor;
a first system memory;
a first coherent interconnect coupled to the first processor and the first system memory;
a first non-coherent interconnect coupled to the first coherent interconnect; and
a first input/output (I/O) device coupled to the first non-coherent interconnect,
wherein the first coherent interconnect is operable to provide a coherent connection to communicate with a second coherent interconnect on a second IC device,
wherein the first non-coherent interconnect is operable to provide a non-coherent connection to communicate with a second non-coherent interconnect on the second IC device, and
wherein the first IC device is operable to transmit a processor transaction from the first processor targeted for a second system memory in the second IC device via the coherent connection.

6. The first IC device of claim 5, wherein the first IC device is operable to transmit an I/O transaction from the first I/O device targeted for a second system memory in the second IC device via the non-coherent connection.

7. The first IC device of claim 6, wherein the second IC device is operable to transmit the I/O transaction received on the second non-coherent interconnect to the second system memory via the second coherent interconnect in the second IC device.

8. The first IC device of claim 5, wherein the first IC device is operable to transmit an I/O transaction from the first I/O device targeted for the first system memory in the first IC device via the first non-coherent interconnect and the first coherent interconnect in the first IC device.

9. The first IC device of claim 5, wherein a maximum allowable data size of a data transfer is larger on the non-coherent connection than on the coherent connection.

10. The first IC device of claim 5, wherein a maximum allowable data size of a data transfer on the coherent connection is a size of a cache-line of the first processor.

11. The first IC device of claim 5, wherein the first IC device is operable to allow processor transactions on the coherent connection to continue while I/O transactions on the non-coherent connection are halted.

12. The first IC device of claim 5, wherein the first IC device is operable to perform I/O transactions on the non-coherent connection without incurring coherency overhead.

13. The first IC device of claim 5, wherein the first IC device is configured with a memory map that maps a second I/O device in the second IC device to a first address range corresponding to the non-coherent connection, and also maps the second I/O device to a second address range corresponding to the coherent connection, and wherein the first IC device is operable to:

direct a first transaction having a first destination address in the first address range from the first processor to the second I/O device on the non-coherent connection; and
direct a second transaction having a second destination address in the second address range from the first processor to the second I/O device on the coherent connection.

14. The first IC device of claim 5, wherein the first IC device is a first system-on-a-chip (SoC), and the second IC device is a second SoC.

15. A computer-implemented method comprising:
receiving a first transaction from a first I/O device on a first system-on-a-chip (SoC);
determining that the first transaction is directed to a second SoC that is coupled to the first SoC via a coherent connection and a non-coherent connection;
upon determining that the first transaction is directed to the second SoC, determining that the first transaction is an I/O transaction from the first I/O device that does not require coherency; and
upon determining that the first transaction is the I/O transaction from the first I/O device that does not require coherency, sending the first transaction to the second SoC via the non-coherent connection,
wherein the first transaction is targeted for a system memory of the second SoC, and
wherein the second SoC receives the first transaction on a non-coherent interconnect and transmits the first transaction from the non-coherent interconnect to the system memory via a coherent interconnect in the second SoC.

16. The computer-implemented method of claim 15, wherein the first transaction is targeted for a second I/O device of the second SoC, and wherein the second SoC receives the first transaction on a non-coherent interconnect and transmits the first transaction to the second I/O device via the non-coherent interconnect in the second SoC.

17. The computer-implemented method of claim 15, further comprising:
receiving a second transaction from a first processor on the first SoC;
determining that the second transaction is directed to a system memory on the second SoC;
upon determining that the second transaction is directed to the system memory on the second SoC, determining that the second transaction is a processor transaction from the first processor that maintains processor cache coherency; and
upon determining that the second transaction is the processor transaction from the first processor that maintains processor cache coherency, transmitting the second transaction to the second SoC via the coherent connection.

18. The computer-implemented method of claim 15, further comprising:
receiving a second transaction from a first processor on the first SoC;
determining that the second transaction is directed to a second I/O device on the second SoC, wherein the second I/O device is memory mapped to a first address range corresponding to the non-coherent connection, and to a second address range corresponding to the coherent connection; and
selecting between the coherent connection or the non-coherent connection to transmit the second transaction based on whether a destination address of the second transaction is in the first address range or in the second address range.

\* \* \* \* \*